(12) United States Patent
Pritchard

(10) Patent No.: US 11,558,584 B2
(45) Date of Patent: Jan. 17, 2023

(54) SYSTEMS AND METHODS FOR PROVIDING REAL-TIME SURVEILLANCE IN AUTOMOBILES

(71) Applicant: Chris Pritchard, Germantown, TN (US)

(72) Inventor: Chris Pritchard, Germantown, TN (US)

(73) Assignee: Chris Pritchard, Germantown, TN (US)

( * ) Notice: Subject to any disclaimer, the term of this patent is extended or adjusted under 35 U.S.C. 154(b) by 0 days.

(21) Appl. No.: 17/211,384

(22) Filed: Mar. 24, 2021

(65) Prior Publication Data

US 2021/0211614 A1 Jul. 8, 2021

Related U.S. Application Data

(63) Continuation-in-part of application No. 16/509,434, filed on Jul. 11, 2019, now abandoned.

(51) Int. Cl.

| | |
|---|---|
| *G06V 20/56* | (2022.01) |
| *H04N 7/18* | (2006.01) |
| *B60R 1/04* | (2006.01) |
| *G08B 25/00* | (2006.01) |
| *G06V 20/59* | (2022.01) |

(52) U.S. Cl.
CPC ............. *H04N 7/188* (2013.01); *B60R 1/04* (2013.01); *G06V 20/56* (2022.01); *G06V 20/59* (2022.01); *G08B 25/005* (2013.01); *H04N 7/181* (2013.01)

(58) Field of Classification Search
USPC ........................................................ 348/148
See application file for complete search history.

(56) References Cited

U.S. PATENT DOCUMENTS

| | | | |
|---|---|---|---|
| 10,582,354 B1* | 3/2020 | Isaac ..................... | H04W 4/90 |
| 10,841,733 B1* | 11/2020 | Sailer ................. | G01C 21/3685 |
| 2005/0258942 A1* | 11/2005 | Manasseh .............. | G07C 5/008 |
| | | | 340/425.5 |
| 2011/0181406 A1* | 7/2011 | Lin .......................... | B60R 1/00 |
| | | | 348/E7.086 |
| 2017/0174137 A1* | 6/2017 | Kawaguchi ............... | B60R 1/12 |
| 2017/0293837 A1* | 10/2017 | Cosatto ................. | G06V 20/58 |
| 2018/0154908 A1* | 6/2018 | Chen ...................... | G07C 5/008 |

(Continued)

FOREIGN PATENT DOCUMENTS

| | | | | |
|---|---|---|---|---|
| CN | 104574570 A | * | 4/2015 | ............... G07C 5/08 |
| CN | 206264899 U | * | 6/2017 | ............... B60R 1/00 |

(Continued)

*Primary Examiner* — Behrooz M Senfi
(74) *Attorney, Agent, or Firm* — Chris Pritchard

(57) ABSTRACT

Techniques for providing real-time vehicle surveillance is disclosed. An in-vehicle surveillance device continuously captures images from the surroundings of a vehicle and the interior of the vehicle and transmits them to a surveillance management system. The images are processed in real-time using machine learning modules to determine primary, secondary, and adverse events. Upon determining the events, alerts are generated and sent to a display unit provided on the in-vehicle surveillance device to improve the safety of the passengers. The techniques further allow vehicle-to-vehicle communication and vehicle to third party device communication upon determining an event.

14 Claims, 6 Drawing Sheets

(56) References Cited

U.S. PATENT DOCUMENTS

| | | | | |
|---|---|---|---|---|
| 2019/0337487 A1* | 11/2019 | de Almeida | ............... | B60R 1/12 |
| 2020/0177885 A1* | 6/2020 | Brugman | ........... | H04N 5/23245 |
| 2020/0189459 A1* | 6/2020 | Bush | ...................... | G06V 10/98 |

FOREIGN PATENT DOCUMENTS

| | | | | |
|---|---|---|---|---|
| CN | 207601875 U * | 7/2018 | ............... | G07C 5/08 |
| DE | 102020125486 A1 * | 5/2021 | ......... | G06K 9/00791 |
| ES | 2680583 T3 * | 9/2018 | ............. | G07C 5/008 |

* cited by examiner

SYSTEMS AND METHODS FOR PROVIDING REAL-TIME SURVEILLANCE IN AUTOMOBILES

CROSS-REFERENCE TO RELATED APPLICATIONS

This application is a continuation in-part of U.S. Non-Provisional patent application Ser. No. 16/509,434 entitled, "INTEGRATED MULTI-VIEW SURVEILLANCE CAMERA SYSTEM FOR VEHICLES" filed Jul. 11, 2019.

TECHNICAL FIELD

The present disclosure is related to the field of image processing. More particularly, the present disclosure is related to methods and systems for providing surveillance in automobiles using image processing techniques.

BACKGROUND

When it comes to purchasing automobiles including passenger vehicles, features related to the safety and security of the driver as well as the passengers are considered as the most important requirements by most buyers. Safety features in vehicles have come a long way over the past several decades. Starting from increasing the sturdiness of the vehicle's structure, innovations such as seat belts, airbags, parking cameras, and the like, have improved passenger safety exponentially. Even though vehicles have become comparatively much safer over the years, the number of accidents and accident-related mortalities aren't coming down. This is mainly due to the fact that more and more individuals are buying vehicles thereby increasing the chances of accidents. Moreover, the performance of vehicles, as well as the quality of roads, have increased drastically thereby indirectly increasing the incidents of serious accidents due to incidents like rash driving, over-speeding, and the like.

Modern-day problems require modern-day solutions. Hence, there is a need to upgrade conventional vehicle accessories to meet the demand of modern-day driving and road conditions. Moreover, efficient use of advanced technological solutions may also be incorporated to improve safety in vehicles. In the present day, it is essential to equip vehicles with advanced electronic image sensor systems to be able to follow road markings and information signs, especially during heavy traffic congestion. Automotive camera modules comprising image sensors and various camera components intended for automotive use may be installed inside or on the front or rear side of a vehicle for increasing the safety of vehicles. Automotive cameras assist drivers in detecting blind spots and parking vehicles. These cameras are mainly intended to prevent collisions, record drivers' inclination, and altogether, offer an enhanced driving experience. Moreover, these cameras serve as high-performance security and surveillance systems for automobiles. Modern automobiles feature advanced camera modules based on several avant-garde technologies, such as 3D depth sensing, ultra HD display, and infrared thermal technology.

Automotive manufacturers are increasingly looking to incorporate state-of-the-art automotive imaging solutions, such as the Advanced Driver Assistance Systems (ADAS), into the vehicles for superior performance. Some of the other advanced automotive imaging solutions include Lane Departure Warning (LDW), Traffic Sign Recognition (TSR), Forward Collision Warning (FCW), Intelligent Headlight Control (IHC), Traffic Jam Assist (TJA), Automatic Emergency Braking (AEB), and Blind Spot Monitoring.

The global automotive camera module market is anticipated to witness exponential growth over the coming years. The key factors conducive to market growth include the surging demand for automotive safety solutions, the rising demand for luxury vehicles, the booming automotive industry, technological enhancements in automotive imaging solutions, the growing demand for autonomous vehicle safety features, and the increasing government initiatives towards the introduction of advanced vehicle safety solutions. The amplifying use of ADAS and other automotive imaging solutions in passenger vehicles due to governmental vehicle safety mandates is a key growth propeller for the global market. For instance, the European Union has reportedly mandated the use of ADAS, LDW, and AEB systems in passenger vehicles in a bid to prevent road mishaps.

US20170293809A1 discloses apparatus, systems and methods for a driver assistance system having a vehicle data sensor configured to collect vehicle data during vehicle operation, an onboard camera and an onboard microphone located in the vehicle and configured to collect audio and video data of a driver and additional driving condition data, a network interface located in the vehicle and coupled to the vehicle data sensor, the onboard camera, and the onboard microphone, the network interface configured to communicate real-time data to a remote user at a remote location, and an onboard display in communication with the network interface and located in the vehicle, wherein the display is configured to display a real-time video and audio feed of the remote user to the driver in the vehicle. A remote display may also be included.

U.S. Pat. No. 10,504,302B1 discloses a vehicle monitoring system with a camera for creating a video or still photo data at the time of a detected accident. The monitoring system monitors a vehicle parameter using a sensor contained within the vehicle. The system may use a processor contained within the vehicle to monitor the vehicle parameter. The system sets a parameter threshold. When the system detects, using the sensor, that the parameter has met the threshold it captures a video or still photo of an area surrounding the vehicle. The system then stores and/or transmits the video or still photo data to a remote server over a network.

U.S. Pat. No. 9,501,878B2 discloses a vehicle event data playback system. The system described herein may provide users means for reviewing events recorded by a vehicle event recorder. Circumstances relating to vehicle operation may be visually presented in these playback systems. Video playback from multiple recording devices may be synchronized with each other and/or with information related to the operation of the vehicle during the recorded events to affect a presentation of information related to the operation of the vehicle. A user may be presented with many data types in graphical and/or intuitive arrangements.

U.S. Pat. No. 10,427,604B2 discloses a vehicular vision system including a driver-side exterior mirror assembly, a passenger-side mirror assembly and an interior mirror assembly. The fields of view of the mirror reflective element of the exterior mirror assemblies are adjustable by the driver via a respective actuator. The exterior mirror assemblies include respective cameras that each have a respective rearward field of view that supplements the field of view of the mirror reflective element when viewed by the driver of the vehicle. A video display is disposed behind the mirror reflector of an interior mirror reflective element such that displayed video images are viewable through the mirror reflector of the interior mirror reflective element. The video display includes a driver-side display portion and a passenger-side display portion that each display images derived from image data captured by the respective camera while not displaying images derived from image data captured by the other camera.

The prior-arts propose several techniques for improving safety in vehicles. Most of the prior-arts use cameras for capturing accidents for incident reporting. While the solutions provided by the prior-arts are useful and innovative, there is a requirement for a comprehensive vehicle surveillance system that not only monitors the surroundings of the vehicles but also provides additional support from a different source during an emergency. A comprehensive in-vehicle surveillance mechanism that uses advanced technological solutions to improve passenger safety will be appreciated in the field of vehicle safety.

The present disclosure addresses the abovementioned technical problems to provide a comprehensive technical solution for improving surveillance mechanisms in vehicles.

SUMMARY

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments described herein disclose an apparatus that may be disposed inside a vehicle for providing real-time surveillance of the surroundings and interior of the vehicle. The data collected during surveillance may be processed to provide useful information for improving passenger safety. The vehicle surveillance system may comprise at least one client device disposed in a primary vehicle comprising at least one processor, a first set of cameras, a second set of cameras, a display unit, and a plurality of sensors. The at least one client device may be programmed or configured to continuously capture images from the surroundings of the primary vehicle using the first set of cameras and images from the interior of the cabin using the second set of cameras. Furthermore, the client device may continuously capture location of the vehicle and speed of the primary vehicle using the plurality of sensors. The captured images, location information, speed information are continuously transmitted to a server. Furthermore, the client device may continuously receive instructions to the display unit of the client device from the server including one or more useful tips for improving passenger safety. Herein, the instructions may include information about other vehicles travelling dangerously closer to the primary vehicle, over-speed warning, route information, driver drowsiness warning, and the like.

Furthermore, the vehicle surveillance system may comprise at least one server computer in communication with the at least one client device programmed or configured to continuously receive data from the client device including images captured from the first and second set of cameras, location information, and speed information. The received image data may be processed to determine primary alert events pertinent to the surroundings of the vehicle. The primary alert events include other vehicles travelling dangerously close to the primary vehicle and route information. Furthermore, images captured from the second set of cameras may be processed to determine secondary alert events, wherein the secondary alert events include alertness of the driver. Furthermore, the captured images from the first and second set of cameras, the location information, and the speed information are processed to determine an adverse event such as an accident or a vehicle breakdown. The server may transmit instructions to the display unit of the client device upon determining primary alert events or secondary alert events. Furthermore, the server may transmit an emergency dataset to one or more emergency contacts upon determining the adverse event. The emergency dataset may include images captured from the first and second set of cameras and location information during the time at which the adverse event occurred.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

Figure 1:
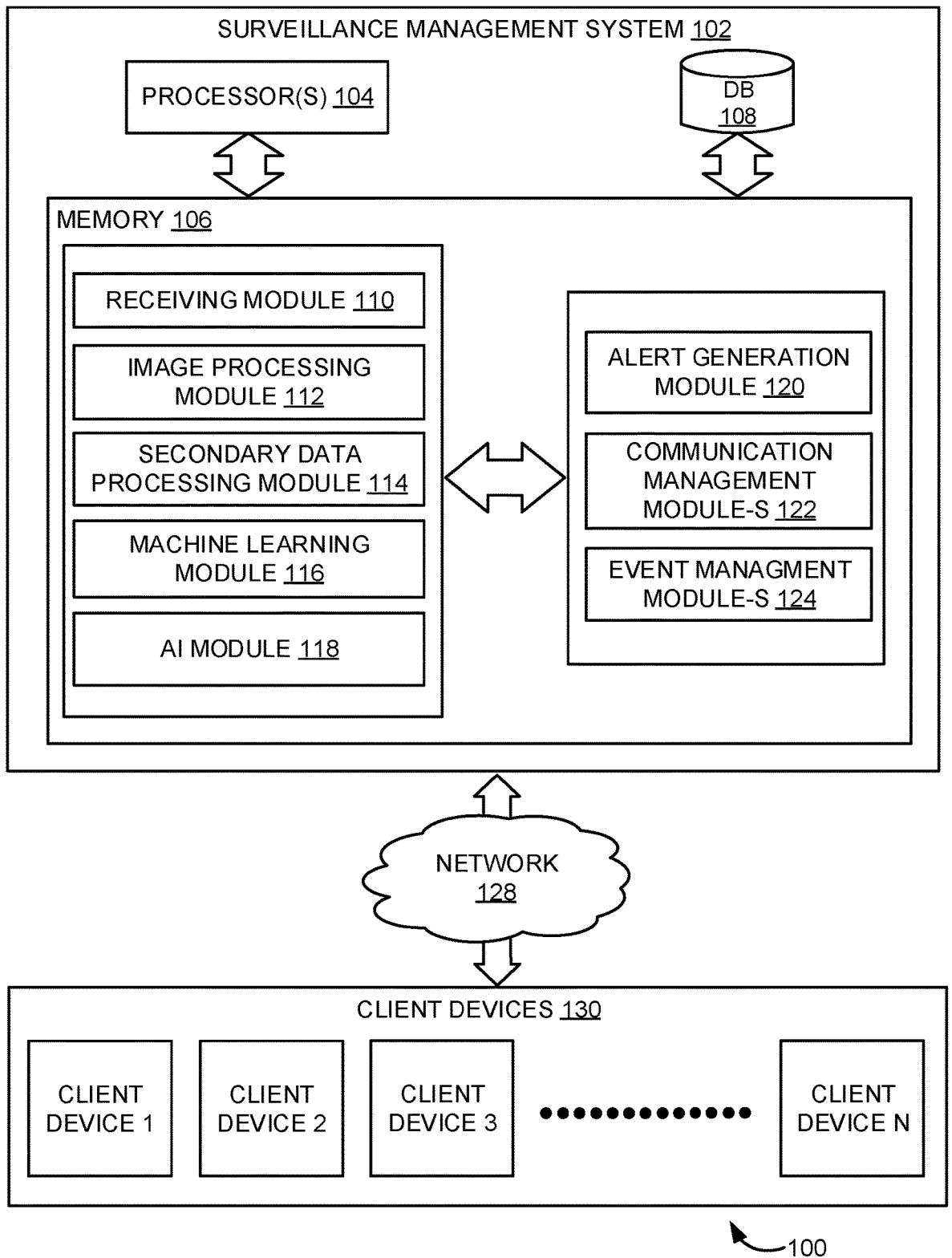
FIG. 1 is a block diagram of the architecture of a surveillance management system according to the embodiments of the present disclosure.

The drawings described herein are for illustration purposes only and are not intended to limit the scope of the present subject matter in any way.

DETAILED DESCRIPTION

Embodiments described herein discloses a device that may be installed inside vehicles for improving passenger safety. The device provides a plurality of features that aids and assists drivers in safe driving of the vehicle. Furthermore, the device assists the drivers and passengers during unexpected scenarios such as accidents, breakdowns, traffic jams, and the like, by readily connecting the driver/passenger to an emergency service. The system primarily comprises a client device communicatively connected to a server. The client device may be disposed inside the vehicle and may replace rear-view mirrors that are conventionally provided inside the vehicle. The client device may comprise a first and second set of cameras for capturing images from the vehicle's surroundings as well as from the interiors of the vehicle. The client device may further comprise a processor, a memory, a plurality of sensors including communication sensors configured to communicate with a server, speed detecting sensors, location detection sensors, and the like.

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments maybe utilized and that changes may be made without departing from the scope of the present invention. The following detailed description is, therefore, not to be taken in a limited sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the foregoing sections, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, the inventive subject matter lies in less than all features of a single disclosed embodiment. Thus, the following claims are hereby incorporated into the detailed description, with each claim standing on its own as a separate embodiment.

In the present disclosure, the term "client device" and "in-vehicle surveillance device" may be used interchangeably to refer to the device disposed inside the vehicle. The server side that is configured to process the data sent by the client device and perform other operations that will be explained in the foregoing sections of this disclosure may be referred to as "surveillance management system" or "server" interchangeably. The terms used herein do not restrict the scope of the present invention. The terms used herein cover all possible technical solutions as understood by a person skilled in the art.

Referring to the figures, FIG. 1 is a block diagram 100 of the architecture of a surveillance management system 102 connected to a plurality of client devices 130 via a network 128. As shown in FIG. 1, the surveillance management system 102 may include processor(s) 104 and memory 106 that are communicatively coupled to each other. Further, the personnel evaluation system 102 may include a database (DB) 108 that may be communicatively connected to the memory 106. Furthermore, as shown in FIG. 1, memory 106 may include a receiving module 110, an image processing module 112, a secondary data processing module 114, a machine learning module 116, an Artificial Intelligence (AI) module 118, an alert generation module 120, a communication management module-s 122, and an event management module-s 124. One or more client devices 130 may be communicatively connected to the surveillance management system 102.

Components of the surveillance management system 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) 104 thus may also include the functionality to encode messages and/or data or information. Processor(s) 104 may include, among other things, a clock, an arithmetic logic unit (ALU), and logic gates configured to support the operation of processor(s) 104. Further, the processor(s) 104 may include functionality to execute one or more software programs, which may be stored in the memory 106 or otherwise accessible to processor(s) 104.

Memory 106, may store any number of pieces of information, and data, used by the system to implement the functions of the system. The memory 106 may include, for example, volatile memory and/or non-volatile memory. Examples of volatile memory may include but are not limited to volatile random-access memory (RAM). The non-volatile memory may additionally or alternatively comprise an electrically erasable programmable read-only memory (EEPROM), flash memory, hard drive, and the like. Some examples of volatile memory include, but are not limited to, dynamic RAM, static RAM, and the like. Some example of the non-volatile memory includes, but are not limited to, hard disks, magnetic tapes, optical disks, programmable read-only memory, erasable programmable read-only memory, electrically erasable programmable read-only memory, flash memory, and the like. Memory 106 may be configured to store information, data, applications, instructions, or the like for enabling the system to carry out various functions in accordance with various example embodiments. Additionally, or alternatively, the memory 106 may be configured to store instructions which when executed by processor(s) 104 cause the surveillance management system 102 to behave in a manner as described in various embodiments.

In one implementation, the network 128 may be a wireless network, a wired network, or a combination thereof. Network 128 may be implemented as one of the several types of networks, such as intranet, local area network (LAN), wide area network (WAN), the internet, and the like. Network 128 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 128 may include a variety of network devices, including routers, bridges, servers, computing devices, storage devices, and the like.

During the operation, the receiving module 110 may receive data from the client devices 130. Data may include images captured by the cameras of the client device, audio captured by the microphone, data from the plurality of sensors, input provided by the user of the client device, and the like. The image processing module 112 may process the images received from the client device to generate useful information. Images received from the client device 130 may include images from the surroundings of the vehicle received from the first set of cameras and images from the cabin of the vehicle received from the second set of cameras. The image processing module processes these images in real-time and determines information including other vehicles travelling close to the primary vehicle on which the client device is disposed, details from the registration plate of the other vehicles, speed of the other vehicles, distance and trajectory of the other vehicles, signboards on the route that is being travelled by the vehicle, any stationary object detected on the route of the vehicle such as construction barriers, cones, diversion signs, speed breakers, etc., upcoming rest areas, upcoming traffic congestion, upcoming danger signs, and the like. In one example, the first and second set of cameras of the client device may have forward, sideward and backward facing cameras to capture information from the surroundings of the vehicle as well as from the interior of the cabin.

The secondary data processing module 114 processes audio, speed, location, and other related data received from the sensors of the client device to determine useful information. The received data are synchronized with the images received from the cameras to determine one or more events. The image processing module 112 and the secondary data processing module 114 work along with the machine learning module 116 and AI module 118 to identify useful information in real-time. While the machine learning module 116 may use existing models to process images for the identification of useful information, it also continues to learn from the data that is being gathered currently. Existing learning models may be adapted with the data received from the client device to further customize the learning model and improve the efficiency of the learning model. The AI module 118 works along with the machine learning module 116 to alert the user upon detecting primary events, secondary events, or adverse events. The alert generation module 120 and the event management module-s 124 may be responsible for determining the events and alerting the user regarding the same. The communication module-s 122 may be responsible for managing all the communication between the server and client devices.

Herein, events that are monitored by the surveillance management system 102 may be classified into primary events, secondary events, and adverse events. Primary events may include events pertinent to the surroundings of the vehicle. Examples of primary alert events include other vehicles travelling dangerously close to the primary vehicle and route information. When another vehicle travels dangerously close to the primary vehicle (the vehicle in which the client device 130 installed is referred to as the primary vehicle throughout this description), the surveillance management system 102 triggers a primary event and notifies the same to the user (the user may include driver or passenger of the primary vehicle). The surveillance management system 102 determines this by calculating the distance and trajectory of other vehicles approaching the primary vehicle. When a predefined speed/trajectory criterion is surpassed, the surveillance management system 102 alerts the user regarding the presence of such a vehicle. Furthermore, route information may also be provided to the user in real-time. Route information may also be considered as a primary event by the surveillance management system 102. Herein, route information may include at least one of: barriers detected on the route, stationary objects detected on the route, upcoming rest areas, upcoming exits, upcoming diversions, upcoming traffic, and the like.

The secondary event may include events such as lacking alertness of the driver, commotion inside the cabin, passengers not wearing seat belts, and the like. Herein, the alertness of the driver is determined by monitoring the eye movements and facial expressions of the driver from the images received. Based on the images received from the cabin, if the driver's eyes are closed for a predetermined amount of time or if the driver yawns or shows other signs related to sleepiness/tiredness, the event management module-s 124 triggers a secondary alert event. The server may send instructions such as warning signals, audio alerts, video alerts, and the like, to the display unit of the client device 130.

An adverse event may include events such as a breakdown of the vehicle, an accident, and the like. Herein, the surveillance management system 102, processes the captured images from the first and second set of cameras, the location information, and the speed information to determine the adverse event. Clues received from the primary alert events such as dangerously driving vehicles, objects and diversions on the road, driver alertness, and the like, are cross-checked upon determining the adverse event to determine possible reasons for the adverse event. If the vehicle comes to an abrupt halt or follows an unexpected trajectory all of a sudden, an adverse event may be predicted. Such events mostly follow after the primary and/or secondary alert event happens. In some cases, such events may happen even without triggering of primary/secondary alert event as well (such as vehicle breakdown). Upon determining an adverse event, the surveillance management system 102 transmits an emergency dataset to one or more emergency contacts. The emergency dataset may include images captured from the first and second set of cameras, location information during the time at which the adverse event occurred, registration information of other vehicles, and the like.

Figure 2:
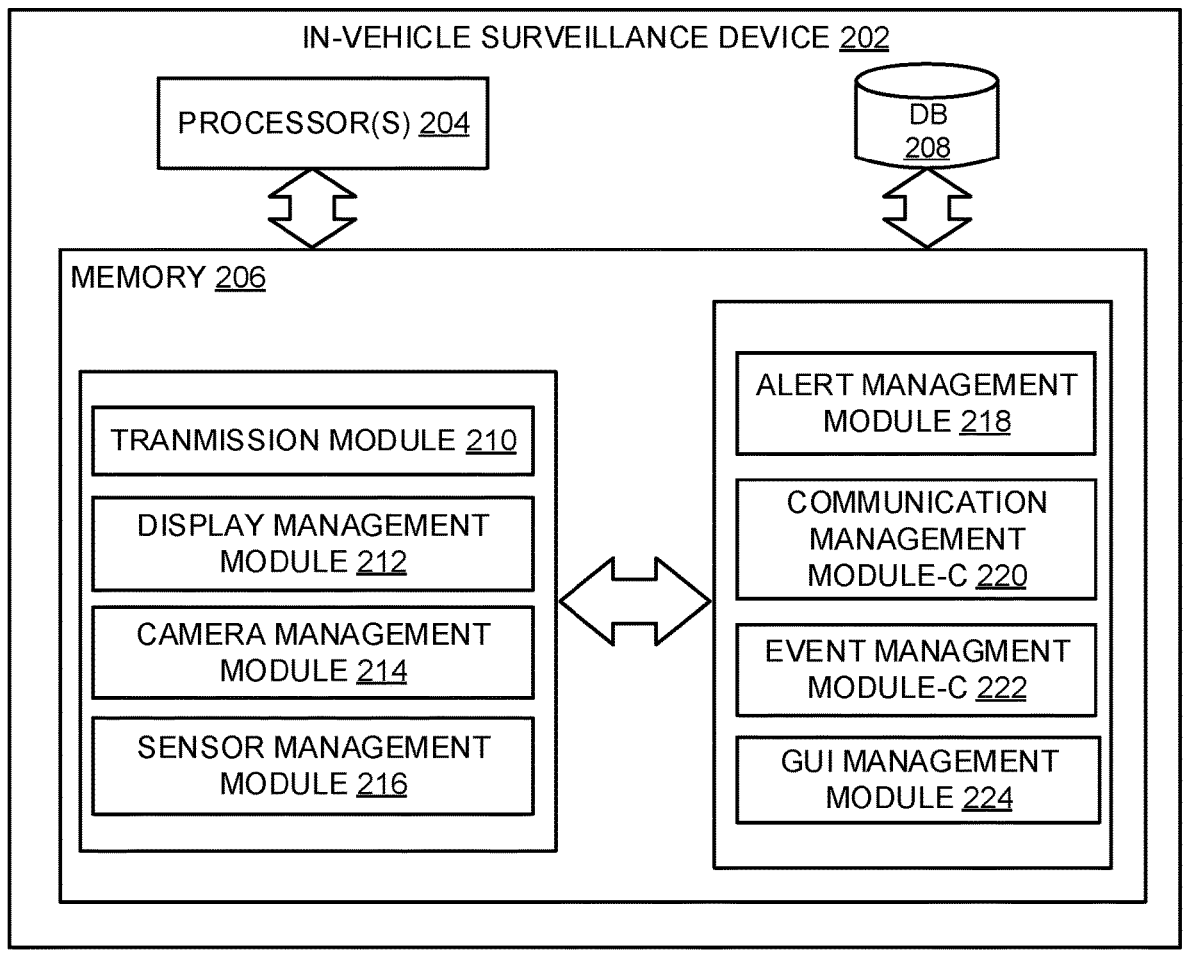
FIG. 2 is a block diagram of the architecture of an in-vehicle surveillance device communicatively connected to the surveillance management system according to the embodiments of the present disclosure.

FIG. 2 is a block diagram 200 of the architecture of an in-vehicle surveillance device 202 communicatively connected to the surveillance management system 102. The in-vehicle surveillance device 202 corresponds to one of the client devices 130 of FIG. 1. The in-vehicle surveillance device 202 may also comprise processor(s) 202 communicatively connected to a memory 206 and a database 208. Memory 208 may include a transmission module 210, a display management module 212, a camera management module 214, a sensor management module 216, an alert management module 218, a communication management module-c 220, an event management module-c 222, and a Graphical User Interface (GUI) management module 224.

During operation, the transmission module 210 may transmit images, sensor data, and other output generated by the in-vehicle surveillance device 202 to the surveillance management system 102. All communication to and from the device is managed by the communication management module-c 220. The display management module 212 manages the display unit of the in-vehicle surveillance device 202. The display unit may comprise a screen capable of displaying images and/or video feeds to the user. The GUI management module 224 may assist the user in providing inputs to the display unit. The camera management module 214 captures images from the surroundings of the vehicle and from the cabin of the vehicle using a first and second set of cameras and transmits them using the transmission module 210. The sensor management module 216 manages the plurality of sensors. The alert management module 218 sends alerts to the display unit while the event management module-c 222 triggers alert based the events determined and notified to the in-vehicle surveillance device 202.

Figure 3:
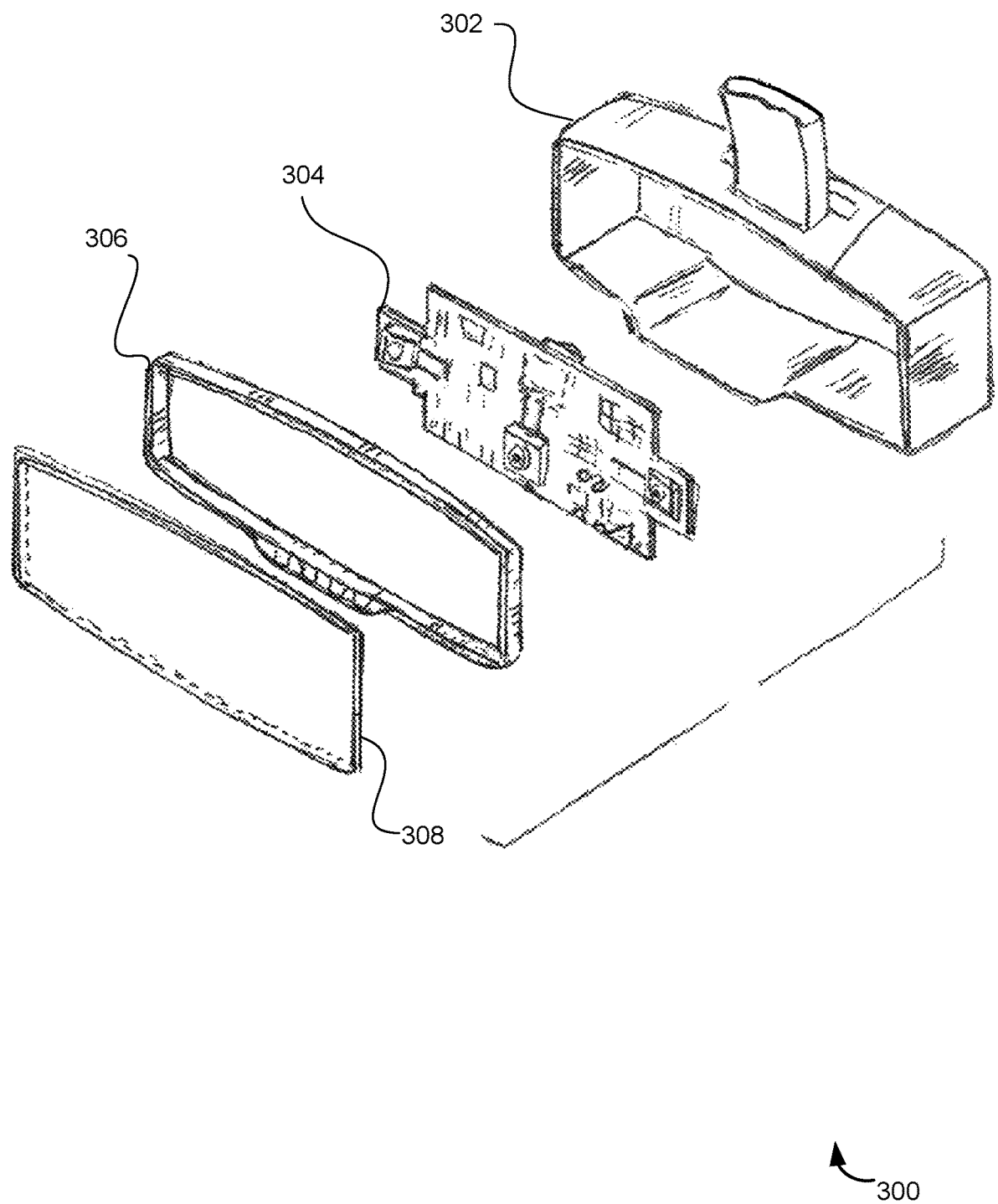
FIG. 3 is an exemplary exploded view of the in-vehicle surveillance device according to the embodiments of the present disclosure.

FIG. 3 is an exemplary exploded view 300 of the in-vehicle surveillance device according to the embodiments of the present disclosure. The casing 302 of the in-vehicle surveillance device comprises of an integrated circuit board 304 onto which various components of the in-vehicle surveillance device may be disposed. Components may include cameras, sensors, and the like. The display unit 306 may be placed on top of the integrated circuit board 304 and may further provide one or more activation controls. Further, a rear-view mirror/touch-enabled screen 308 may be provided on the top of the display. When the display is turned off, screen 308 may act as a rear-view mirror.

Figure 4:
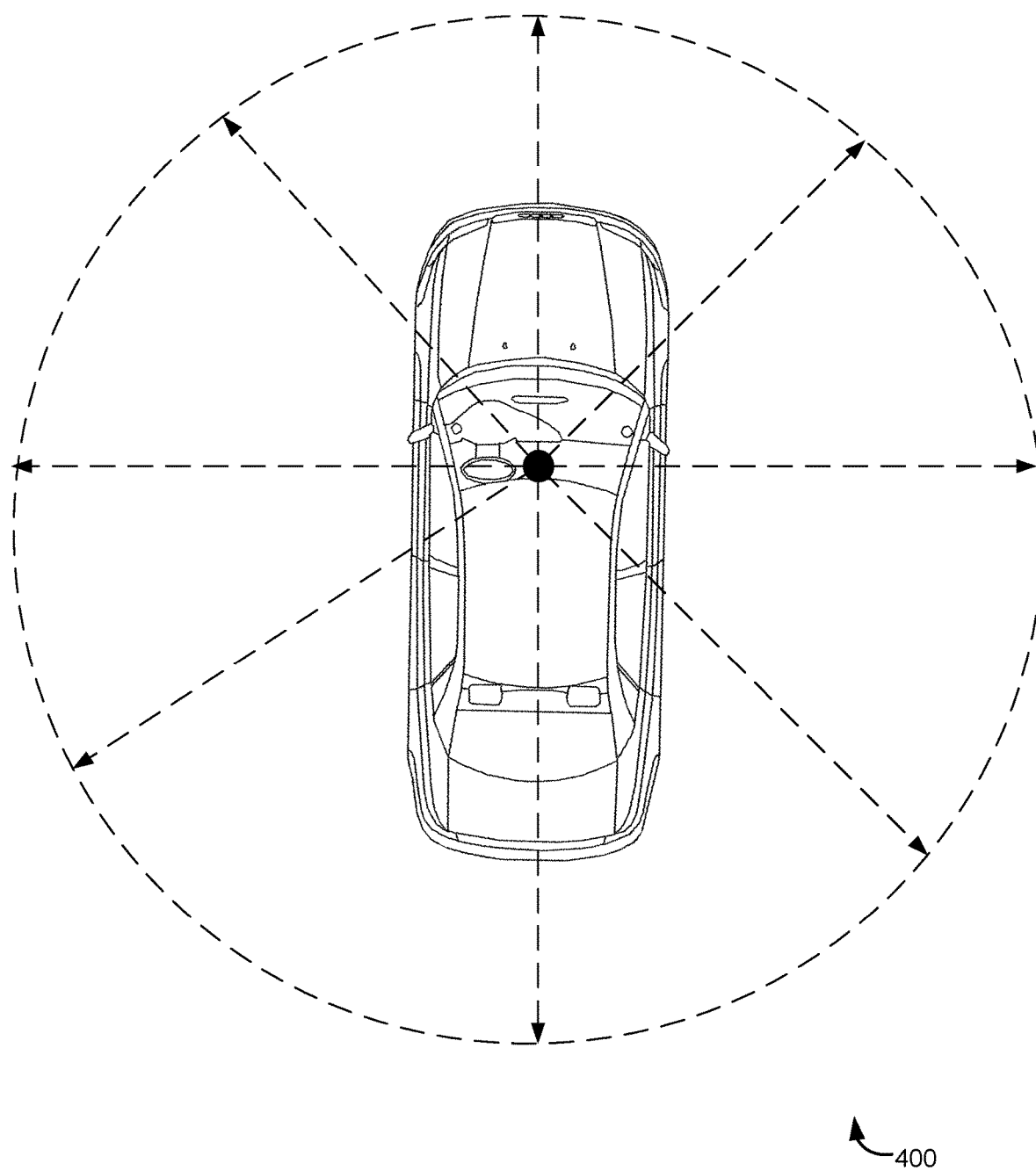
FIG. 4 is an exemplary top plan view of a vehicle equipped with the in-vehicle surveillance device described herein according to the embodiments of the present disclosure.

FIG. 4 is an exemplary top plan view 400 of a vehicle equipped with the surveillance system described herein according to the embodiments of the present disclosure. As illustrated by the figure, the client device disposed inside the vehicle captures 360-degree views. The captured images are sent for real-time processing to receive useful information as described in the earlier sections of this document.

Figure 5:
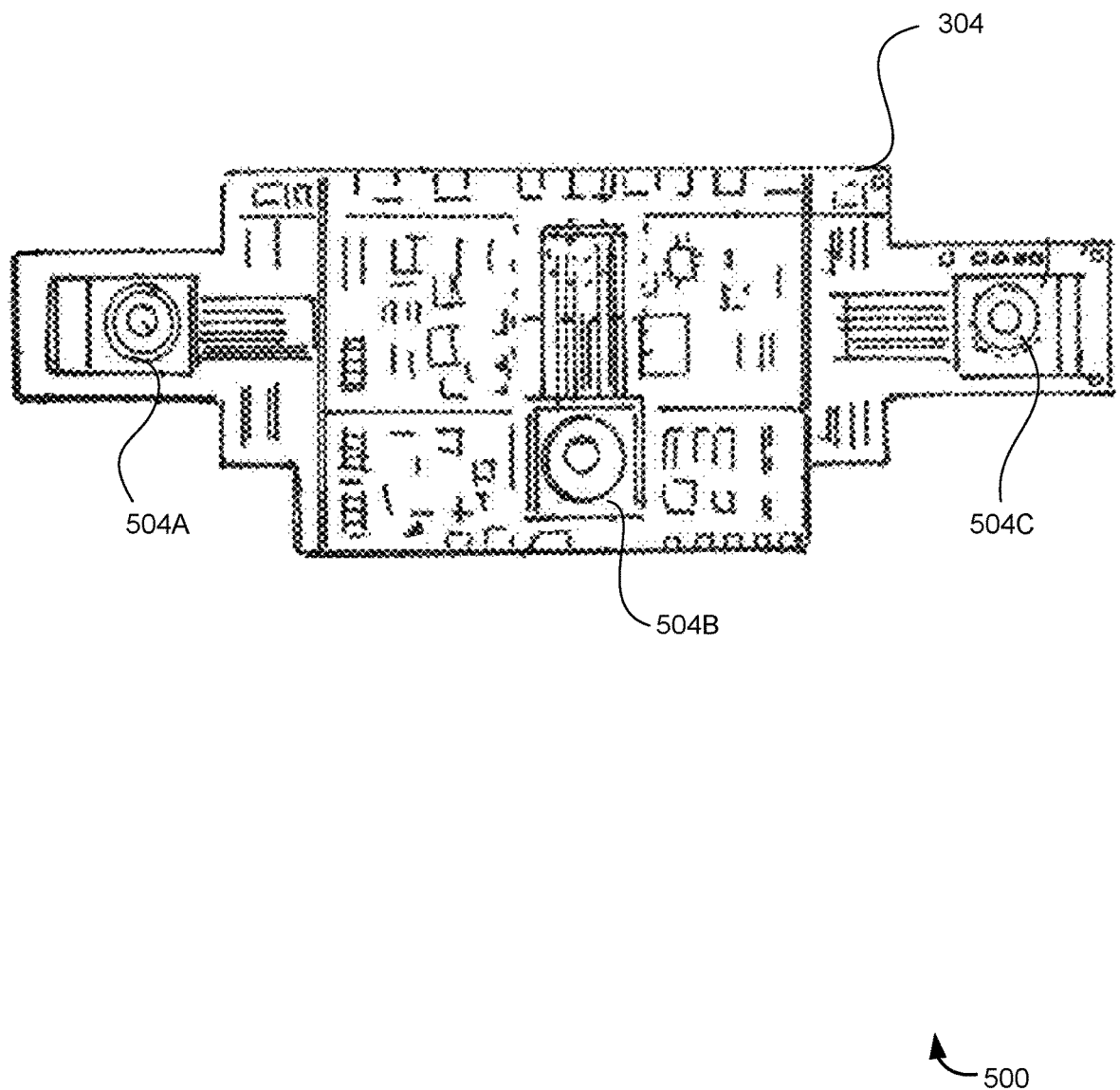
FIG. 5 is an exemplary integrated circuit board disposed within the in-vehicle surveillance device according to the embodiments of the present disclosure.

FIG. 5 is an exemplary view 500 of the integrated circuit board 304 disposed within the in-vehicle surveillance device according to the embodiments of the present disclosure. The integrated circuit board 304 may comprise one or more cameras (504A, 504B, 504C, etc.) on its front and rear sides.

Figure 6:
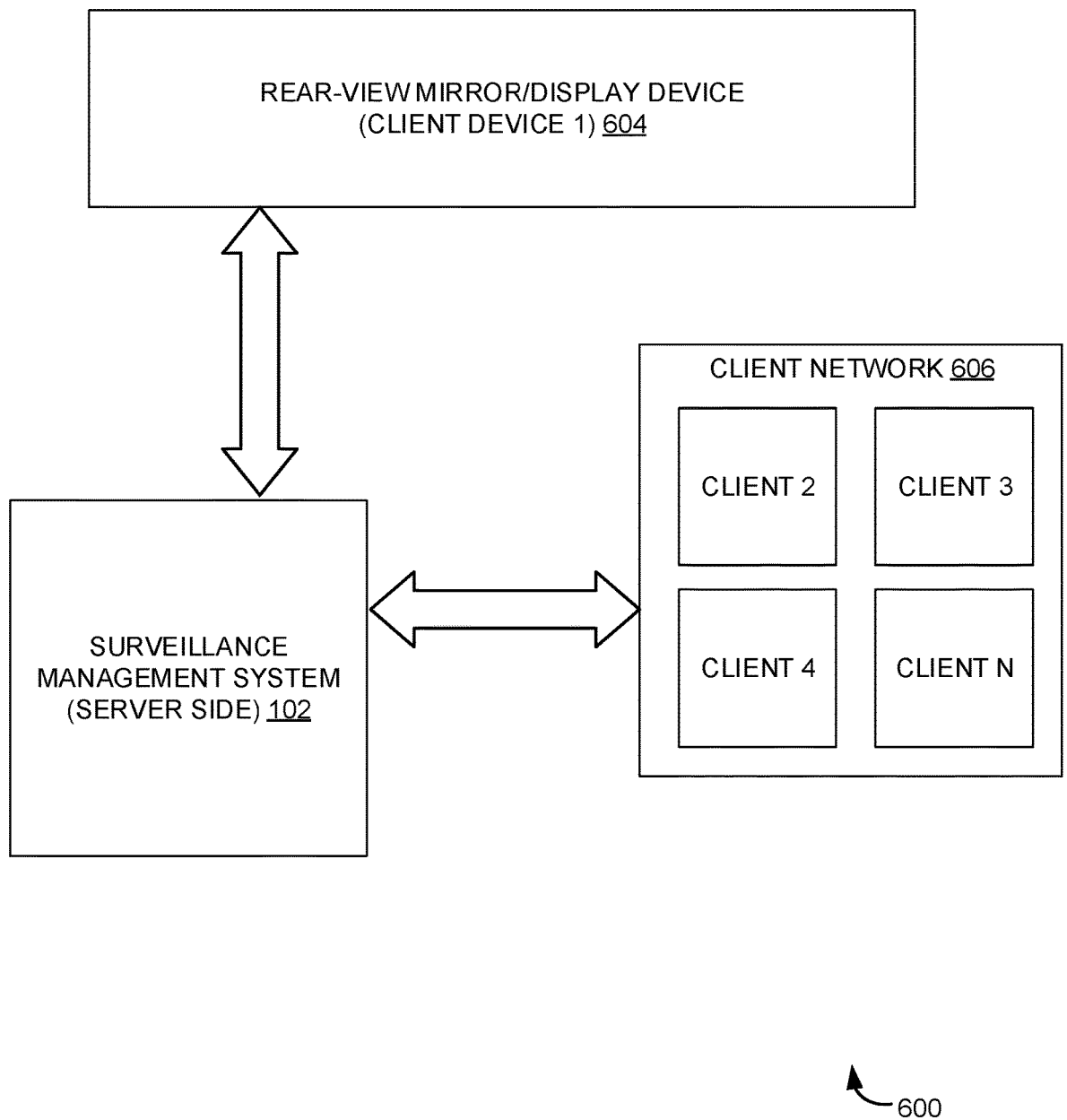
FIG. 6 is an exemplary block diagram illustrating the communication flow between various primary components of the vehicle surveillance system according to the embodiment of the present disclosure.

FIG. 6 is an exemplary block diagram 600 illustrating the communication flow between various primary components of the vehicle surveillance system. Herein, the surveillance management system 102 operated from the server side is configured to communicate with one or more client devices and provide useful information as instructions to the in-vehicle communication device in real-time. The rear-view mirror/display device 604 may be used for communicating with the user in real-time via the server. Furthermore, client network 606 may comprise one or more similar client devices installed in other vehicles. The server may also be configured to allow vehicle-to-vehicle communication by allowing various client devices to connect to each other. In one example, two different vehicles fitted with client devices depicted in this disclosure may be allowed to communicate with each other via the server. The server may allow users of one such client device to communicate directly to the other using video/audio/text-based communication methods.

In one example, the in-vehicle surveillance system 202 may further comprise a microphone that captures audio feeds from the cabin of the primary vehicle. The surveillance management system 102 may allow one client device disposed in the primary vehicle to communicate with another client device disposed in a second vehicle. The surveillance management system 102 may further allow a user of one client device to communicate with a user of another client deice via audio calls, video calls, or text messages. In another example, the surveillance management system 102 may allow the client device to communicate with an electronic device such as a smartphone, a personal computer, a laptop, a tablet, and the like. Herein, the server may allow a user of the client device to communicate with the electronic device via audio calls, video calls, or text messages.

In one example, the surveillance management system 102 may combine location information and speed information of the primary vehicle with the images captured from the primary and secondary cameras and the audio captured from the microphone to determine the occurrence of adverse events. Further, emergency contacts who may be contacted upon determining adverse events include friends or family chosen by the vehicle owner, towing services, vehicle service centers, insurance companies, law enforcement agencies, emergency services closest to the location at which the adverse incident happened, and the like.

In one example, the cameras used in the client device are equipped with night vision capabilities and infrared sensors. The client device may replace the traditional rear-view mirror and may be designed to look and act as a rear-view mirror with additional functionalities as described by the present disclosure. The outer portion of the display unit may be equipped with a reflective element that acts as a mirror for viewing rearward field of view when the display is switched off.

In one example, the client device may further be provided with local storage for storing captured data apart from transmitting them to the server. The local storage may store data for a fixed period of time before overwriting the same. In scenarios such as loss of network connectivity, the data may be stored in the local storage and then transmitted to the server upon reestablishing the connection.

In one example, the surveillance management system 102 may scan the registration plate of other vehicles that travel near the primary vehicle to determine publically available data related to the registration number of the other vehicle such as the make of the other vehicle, model of the other vehicle, the registration date of the other vehicle, insurance details of the other vehicle, owner information of the other vehicle, and the like. In case of an adverse incident, this data may be used to determine/track vehicles that were travelling nearby.

In one example, the server may provide an automated response mechanism for determining primary, secondary, or adverse events. An automated communication may be initiated by the server to allow users to provide their queries or requirements immediately via the touch-enabled display unit of the in-vehicle surveillance device. Upon determining an event, the server may either allow a dedicated executive to communicate manually with the driver/passenger of the vehicle via text/video/audio-based communication means via the display unit. Herein, a dedicated individual may communicate directly with the driver/passenger to identify their present status and requirements. Images and other related data may be retrieved by the executive to identify the present circumstances to provide appropriate service. Alternatively, this process may also be automated. Herein, an intelligent communication system backed by the AI module may establish communication with the driver/passenger to receive requirements. The system may fulfill the requirements automatically or transfer them to the dedicated executive depending upon the type of request received.

In one example, the server may allow the client device to communicate with an electronic device such as a smartphone, a personal computer, a laptop, or a tablet. Herein, the server may allow a user of the client device to communicate with the electronic device via audio calls, video calls or text messages. Herein, passengers may be able to communicate directly with individuals using any electronic device via the display unit, the cameras, and the microphone of the client device. Similarly, communication may also be possible from one client device to another client device disposed in another vehicle. The server may be able to connect multiple client devices in the client device network to facilitate communication among multiple vehicle owners who have vehicles fitted with the proposed client device.

One of the key advantage of the proposed solution compared to existing solutions is that the client device used herein is disposed inside the vehicle as a single unit with cameras and sensors attached to it. The advantage of such a device is that the cameras and sensors are not prone to external conditions such as heat, rain, snow, dust, and the like. The secure positioning of the client device makes it less vulnerable to wear and tear as well. Cameras and sensors placed externally to capture the surroundings may be damaged easily due to external factors as mentioned above. The proposed client device overcomes these problems by providing a safer and robust alternative.

Moreover, repair and upgradation of the client device may be comparatively easier since most of the components are disposed within the device at a single location which is easily accessible. While conventional solutions provide multiple sensors and cameras placed around the vehicle's body, it may be costly and time consuming to diagnose problems. Technicians may further have to work on different parts of the vehicle to remove/replace faulty components thereby causing a lot of hardships to the technicians as well as to the vehicle owner. The solution presented herein avoids such complications and provides a client device that comprises all the primary components in one place.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying claims, abstract, and drawings), and all of the steps of any method or process so disclosed, may be combined in any combination, except combinations where at least some of such features or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A vehicle surveillance system, comprising:
at least one client device disposed as an accessory replacing rearview mirror in a primary vehicle comprising at least one processor, a first set of cameras, a second set of cameras, microphones, a display unit, and a plurality of sensors, the at least one client device programmed or configured to:
continuously capture images from the surroundings of the primary vehicle using the first set of cameras and images from the interior of the cabin using the second set of cameras;
continuously capture audio from the cabin of the primary vehicle using the microphones;
continuously capture location of the primary vehicle and speed of the primary vehicle using the plurality of sensors;
transmit the captured images from the first and second set of cameras, the captured location information, and captured speed information to a server;
receive instructions to the display unit from the server, wherein the instructions include: information about other vehicles travelling dangerously closer to the primary vehicle, over speed warning, route information, or driver drowsiness warning; and
enable audio and video calls using the display unit, the second set of cameras, and the microphones for allowing the user of the client device to communicate in real-time with a second user of a second client device disposed in a second vehicle; and
at least one server computer in communication with the at least one client device and programmed or configured to:
continuously receive data from the client device including images captured from the first and second set of cameras, location information, and speed information;
process the captured images from the first set of cameras to determine primary alert events pertinent to the surroundings of the vehicle, wherein the primary alert events include other vehicles travelling dangerously close to the primary vehicle and route information;
process the captured images from the second set of cameras to determine secondary alert events, wherein the secondary alert events include alertness of the driver, and wherein the alertness of the driver is determined by monitoring the eye movements and facial expressions of the driver;
process the captured images from the first and second set of cameras, audio captured by the microphones, the location information, and the speed information to determine an adverse event including an accident or a vehicle breakdown;
transmit instructions to the display unit of the client device upon determining primary alert events or secondary alert events; and
transmit an emergency dataset to one or more emergency contacts upon determining the adverse event, wherein the emergency dataset includes images captured from the first and second set of cameras, speed information, and location information during the time at which the adverse event occurred.

2. The vehicle surveillance system of claim 1, wherein the server allows the at least one client device to communicate with an electronic device, wherein the electronic device includes a smartphone, a personal computer, a laptop, or a tablet.

3. The vehicle surveillance system of claim 1, wherein the one or more emergency contacts include: friends or family chosen by the vehicle owner, towing services, vehicle service centers, insurance companies, law enforcement agencies, and emergency services closest to the location at which the adverse incident happened.

4. The vehicle surveillance system of claim 1, wherein images received from the first set of cameras are processed by the server using artificial intelligence based image processing techniques to determine the distance and speed of other vehicles travelling near the primary vehicle.

5. The vehicle surveillance system of claim 4, wherein the server determines if the other vehicles are travelling dangerously close to the primary vehicle based on the distance and speed of other vehicles.

6. The vehicle surveillance system of claim 1, wherein the images received from the first set of cameras are processed by the server using artificial intelligence based image processing techniques to determine gutters or stationary objects on the approaching road.

7. The vehicle surveillance system of claim 1, wherein the images received from the second set of cameras are processed by the server using artificial intelligence based image processing techniques to track the eye movements, facial expressions, and facial angles of the driver continuously to determine if the driver is drowsy.

8. The vehicle surveillance system of claim 1, wherein the first and second set of cameras are equipped with night vision capabilities.

9. The vehicle surveillance system of claim 8, wherein the first and second set of cameras are equipped with infrared sensors.

10. The vehicle surveillance system of claim 1, wherein the outer portion of the display unit is equipped with a reflective element that acts as a mirror for viewing rearward field of view when the display is switched off.

11. The vehicle surveillance system of claim 1, wherein the at least one client device has a local storage for storing captured data.

12. The vehicle surveillance system of claim 1, wherein route information include: barriers detected on the route, stationary objects detected on the route, upcoming rest areas, upcoming exits, upcoming diversions, and upcoming traffic.

13. The vehicle surveillance system of claim 1, wherein the system scans the registration plate of other vehicles to determine publically available data related to the registration number of the other vehicle.

14. The vehicle surveillance system of claim 13, wherein publically available data comprise at least one of: make of the other vehicle, model of the other vehicle, registration date of the other vehicle, insurance details of the other vehicle, and owner information of the other vehicle, and wherein the publically available data is transmitted to the at least one client device and to the one more more emergency contacts upon determination of an adverse event.

* * * * *